June 17, 1958     C. D. STRANG     2,839,036
ROTARY VALVE TIMING MECHANISM
Filed May 7, 1956     2 Sheets-Sheet 1
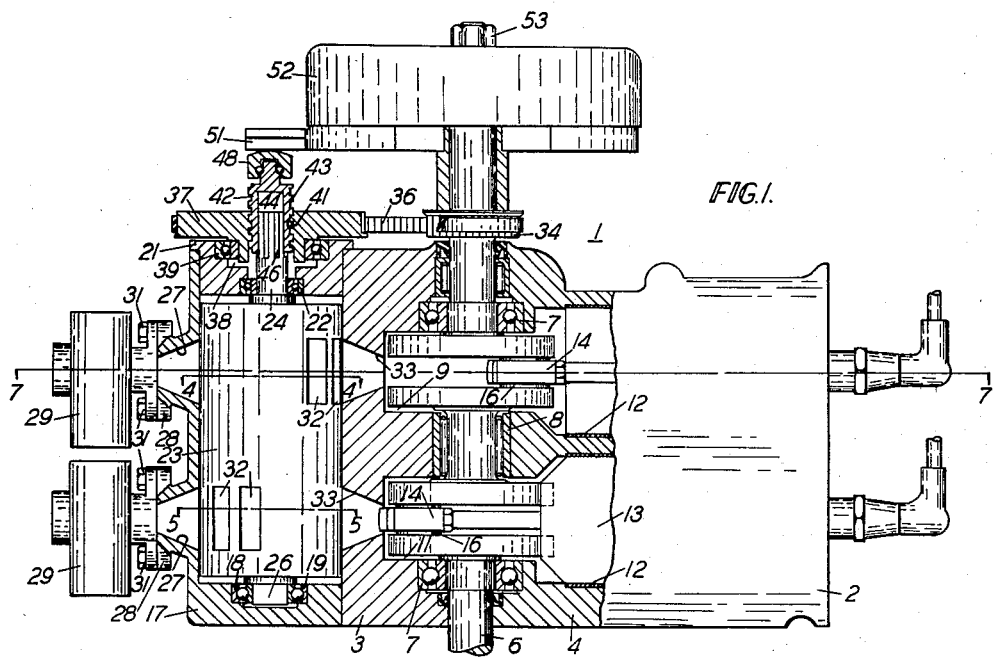
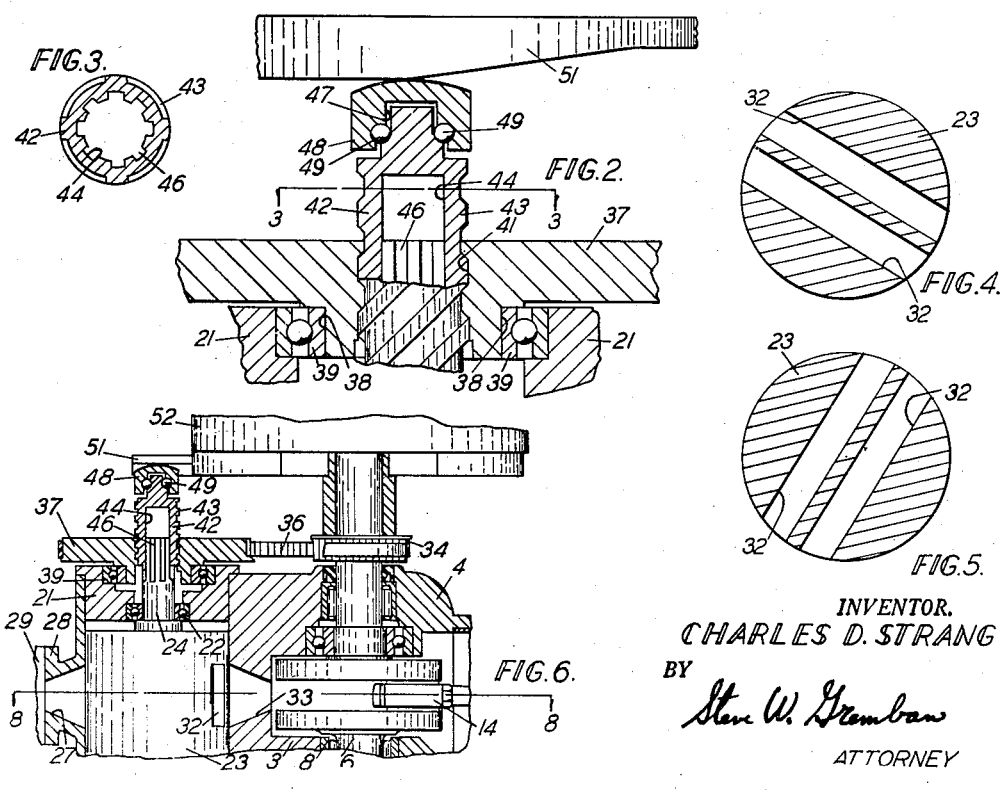
INVENTOR.
CHARLES D. STRANG
BY
*Steve W. Gramban*
ATTORNEY June 17, 1958  C. D. STRANG  2,839,036
ROTARY VALVE TIMING MECHANISM
Filed May 7, 1956  2 Sheets-Sheet 2

INVENTOR.
CHARLES D. STRANG
BY
ATTORNEY

United States Patent Office 2,839,036
Patented June 17, 1958

2,839,036

ROTARY VALVE TIMING MECHANISM

Charles D. Strang, Oshkosh, Wis., assignor to Kiekhaefer Corporation, Cedarburg, Wis., a corporation of Wisconsin Application May 7, 1956, Serial No. 583,288

2 Claims. (Cl. 123—73)

This invention relates generally to an internal combustion engine and more specifically to means for varying the angular phase relationship between the rotary valve and the crankshaft of a two-cycle internal combustion engine.

In a two-cycle internal combustion engine utilizing a rotary valve for the introduction of a combustible fuel mixture into the crankcase, the crankshaft is mechanically connected to the rotary valve for transmitting the rotary movement of the crankshaft to the valve. In these prior art engines, the angular phase relationship between the crankshaft and the rotary valve is a fixed value throughout the operative speed range of the engine, that is from idling to maximum speed in revolutions per minute (R. P. M.). For the purpose of clarification, angular phase relationship between the crankshaft and rotary valve is defined as the relative angular position of one with respect to the other. In other words, if the crankshaft is in a position such that a piston is at top dead center and the rotary valve is in a predetermined position with respect thereto, advancing or retarding the rotary valve a certain number of degrees from this predetermined position by rotatively moving the rotary valve with the crankshaft remaining in its original position changes the angular phase relationship between the crankshaft and valve. If the angular phase relationship is established to give excellent engine performance in the high R. P. M. range, the engine normally performs badly at idling and in the lower R. P. M. range with this fixed angular relationship, it is possible to get good engine operating characteristics over only a small portion of the operative R. P. M. range of the engine. Applicant's invention contemplates means for varying the angular phase relationship between the crankshaft and the rotary valve throughout the R. P. M. range of the engine resulting in better engine performance over the entire R. P. M. range of the engine.

It is therefore an object of the present invention to provide means for varying the angular phase relationship between the crankshaft and the rotary valve of a two-cycle internal combustion engine for achieving increased engine performance throughout the entire R. P. M. range of the engine.

Another object of the invention is the provision of means for varying the angular phase relationship between the crankshaft and the rotary valve throughout the R. P. M. operating range of the engine.

Objects and advantages other than those set forth above will be apparent from the following description when read in connection with the accompanying drawing, in which:

Fig. 1 is a side elevation view partially in section of a two-cycle internal combustion engine showing the mechanism for varying the angular phase relationship between the crankshaft and rotary valve with the engine in a position of minimum throttle;

Fig. 2 is an enlarged segmental view in section of the portion of the engine of Fig. 1 in which the invention is embodied;

Fig. 3 is a section view taken on line 3—3 of Fig. 2;

Fig. 4 is a section view taken on line 4—4 of Fig. 1;

Fig. 5 is a section view taken on line 5—5 of Fig. 1;

Fig. 6 is a view similar to Fig. 1 showing the mechanism for varying the angular phase relationship between the crankshaft and the rotary valve with the engine in a position of maximum throttle;

Figure 7:
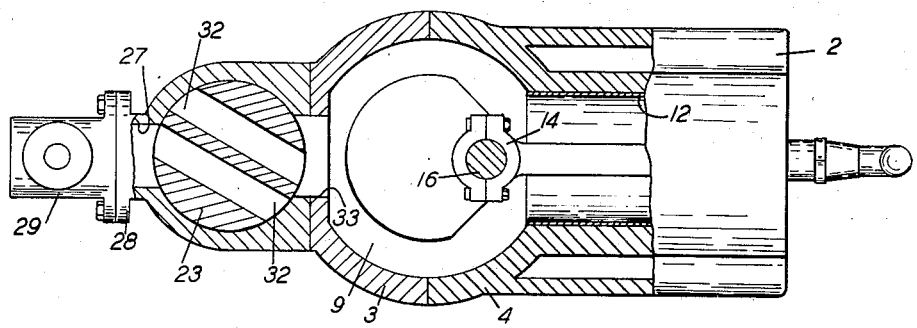
Fig. 7 is a view taken on line 7—7 of Fig. 1 showing the angular phase relationship between the crankshaft and the rotary valve at minimum engine throttle.

As shown in the drawings, this invention is illustrated as applied to a two-cycle internal combustion engine 1 comprising a cylinder block 2 mounted on crankcase members 3, 4 joined together on a transverse plane passing through the axis of the engine crankshaft 6. The crankshaft 6 is supported at each end by bearing assemblies 7 carried by the crankcase members 3, 4. A main bearing 8 formed by the crankcase members 3, 4 divides the crankcase into upper and lower crank chambers 9, 11.

The cylinder block 2 forms two cylinder bores 12, each opening into the crankcase and carrying a piston 13 connected by a rod 14 to the corresponding upper and lower crank throws 16 respectively of the crankshaft 6. The crank throws 16 are spaced 180 degrees with respect to the crankshaft axis so that the pistons 13 reciprocate in opposite directions for alternate firing or with each 180 degrees of crankshaft rotation.

A substantially cylindrical housing 17 is mounted to the lower crankcase member 3 and is provided with a bore 18 at one end into which a bearing 19 is disposed and a cap member 21 on the opposite end for carrying a bearing 22. A cylindrical rotary valve 23 is mounted within the housing 17 having axial shaft portions 24, 26 supported by the bearings 19, 22. The housing 17 further includes passages 27 terminating in a flange 28 to which carburetors 29 are mounted by means of cap screws 31. The rotary valve 23 is provided with passages 32 passing therethrough as shown in Figs. 4 and 5 which in various positions of the rotary valve 23 register with passageways 33 provided in the crankcase member 3 to provide a path for admitting the fuel mixture from the carburetors 29 to the crank chambers 9, 11.

In the two cycle operation of the engine 1, the fuel mixture is admitted into the cylinder bores 12 from the crank chambers 9, 11 through passages, not shown, in the side of the cylinder block 2. The exhaust gases are discharged through exhaust ports, not shown, opening from each cylinder 12 into suitable exhaust means, not shown. The intake and exhaust ports of each bore 12 are controlled by the respective piston 13 which opens the ports at the lower end of each piston stroke and otherwise closes the ports during the compression and power stroke.

The precompression of the fuel mixture for transfer of the mixture through the passages to the respective cylinders 12 and displacement of the exhaust gases remaining in the fired cylinder is effected within each crank chamber 9, 11 by the corresponding piston 13 during the downward power stroke.

The rotary valve 23 is connected to the crankshaft 6 by a gear-belt transmission system comprising a gear pulley 34 mounted on the crankshaft 6 drivingly connected by means of a non-slipping cog belt 36 such as the Gilmer belt to a gear pulley 37 associated with the rotary valve 23. The crankshaft gear pulley 34 makes two revolutions for each revolution of the rotary valve gear pulley 37. Since the valve 23 opens the fuel passageway twice per revolution, the passageway will be opened once for each complete revolution of the crankshaft 6. The gear pulley 37 is provided with an axially extending coaxial ring 38 forming a seat for a bearing 39 carried by the cap 21. The gear 37 is further provided with an axial helical threaded bore 41 for receiving a sleeve member 42 having peripheral helical threads 43 and a spline receiving bore 44 for receiving the splines 46 formed by one end of the rotary valve shaft 24. One end of the sleeve member 42 is stepped and corresponds to a stepped bore 47 formed by a cam follower 48. The cam follower 48 and the stepped end of the sleeve member 42 cooperate to form a seat for a ball bearing 49. The cam follower 48 engages a cam 51 secured to a magneto 52 which is mounted on one end of the crankshaft 6 by means of a nut 53. The helical thread 43 of the sleeve member 42 is so disposed that normal rotation of the crankshaft 6 in operation of the engine 1 causes the rotary valve gear 37 to urge the sleeve member 42 upwardly against the cam element 51. Once the sleeve member 42 is in engagement with the cam element 51, the rotary valve gear 37, sleeve member 42, and rotary valve 23 rotate as a unit.

Figure 8:
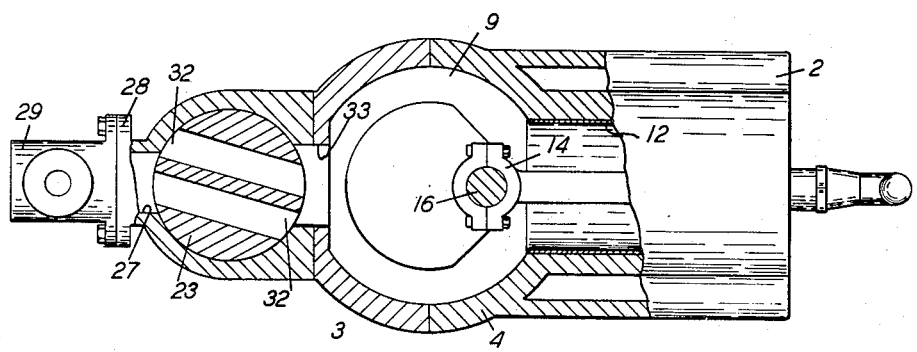
Fig. 8 is a view taken on line 8—8 of Fig. 6 showing the angular phase relationship between the crankshaft and the rotary valve at maximum engine throttle.

In the operation of the engine 1, as the magneto 52 and cam element 51 are rotatively moved to advance or retard the spark as the throttle is increased or decreased respectively, the sleeve member 42 is selectively movable axially in one direction by the cam 51 or in the other direction by the gear 37 depending upon whether the magneto 52 is pivotably moved to decrease or increase the engine speed. The axial movement of the sleeve member 42 results in a relative angular movement between the rotary valve gear 37 and the rotary valve 23. This provides an effective means for varying the angular phase relationship between the crankshaft 6 and the rotary valve 23 to obtain maximum engine operating performance throughout the full operating R. P. M. range of the engine. This is brought out more clearly by an inspection of Figs. 1 and 7 which show the angular phase relationship of the rotary valve 23 with respect to the crankshaft 6 at minimum engine throttle. The phase relationship is established for optimum engine performance at minimum throttle and shows the rotary valve 23 closing with the crankshaft 6 disposed with the piston 13 at top dead center. This angular relationship permits maximum fuel mixture flow into the crank chamber 9. As the engine speed is increased by rotatively moving the magneto 52, the rotary valve gear 37 urges the sleeve member 42 upwardly following the cam surface 51, and the upward movement of the sleeve member 42 permits the rotary valve gear 37 to rotatively advance without driving the rotary valve 23. When the engine speed is maximum as shown in Figs. 6 and 8, the valve gear 37 has advanced with respect to the valve 23 so that with the crankshaft 6 disposed with the piston 13 at top dead center as was illustrated for minimum throttle, the rotary valve 23 is still open, and will close when the piston 13 is a predetermined number of degrees after top-dead center. The late closing of valve 23 is advantageous in permitting the high inertia of the fuel mixture in the higher R. P. M. range to continue forcing fuel mixture into the crank chamber 9 even with the piston 13 partially on the down travel. This results in increased volumetric efficiency and good engine performance in the high R. P. M. range.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In a two-cycle internal combustion engine, the combination of: a crankcase; a crankshaft rotatably mounted within said crankcase; a rotary valve connected to said crankcase for controlling the introduction of a fuel mixture therein; an axial splined shaft for said rotary valve; a sleeve member having a threaded periphery and a splined bore for receiving said splined shaft for axial movement of said sleeve member on said shaft; a pulley rotatively driven by said crankshaft and having an axial threaded bore adapted to receive said threaded periphery of said sleeve member, a magneto mounted on said crankshaft and having a stator plate adapted upon pivotal movement to advance the spark as the engine speed is increased; a cam mounted on the stator plate of said magneto; and a cam follower formed by one end of said sleeve member adapted to engage said cam whereby upon pivotal movement of said magneto stator plate said sleeve member is movable axially providing for angular displacement of said rotary valve with respect to said pulley and said crankshaft.

2. In a two-cycle internal combustion engine, a crankcase, a crankshaft rotatably mounted within said crankcase, a rotary valve connected to said crankcase for controlling the introduction of a fuel mixture to the crankcase and provided with a shaft, an externally threaded sleeve member mounted on the valve shaft and being movable axially with respect to the shaft and interlocked therewith circumferentially to rotate therewith, a pulley member having a threaded bore disposed on said sleeve member and being rotatably driven by the crankshaft to drive said valve in timed relation to the engine, movable control means provided on said engine in response to which the engine speed is increased, and a cam surface carried by the control means, said sleeve member engaging said cam surface and being angularly and axially movable with respect to the pulley member through the threaded engagement therebetween upon movement of said control means to provide angular displacement of the valve relative to the pulley and crankshaft.

References Cited in the file of this patent

UNITED STATES PATENTS

| 1,907,725 | Bracke | May 9, 1933 |
| 1,920,924 | Gorden | Aug. 1, 1933 |
| 2,011,804 | DuBois | Aug. 20, 1935 |
| 2,057,354 | Winthers et al. | Oct. 13, 1936 |
| 2,148,249 | Thomas | Feb. 21, 1939 |
| 2,256,948 | Lloyd | Sept. 23, 1941 |

FOREIGN PATENTS

| 405,464 | France | Nov. 15, 1909 |